United States Patent
Takada

(10) Patent No.: US 6,836,348 B2
(45) Date of Patent: Dec. 28, 2004

(54) IMAGE DISPLAY DEVICE AND HOLOGRAPHIC SCREEN

(75) Inventor: Kenichirou Takada, Kuwana (JP)

(73) Assignee: Denso Corporation (JP)

(*) Notice: Subject to any disclaimer, the term of this patent is extended or adjusted under 35 U.S.C. 154(b) by 0 days.

(21) Appl. No.: 10/376,271

(22) Filed: Mar. 3, 2003

(65) Prior Publication Data

US 2003/0169469 A1 Sep. 11, 2003

(30) Foreign Application Priority Data

Mar. 5, 2002 (JP) ........................................ 2002-059110

(51) Int. Cl.[7] .............................................. G02B 5/32
(52) U.S. Cl. .............................. 359/15; 359/12; 359/24; 359/28
(58) Field of Search .............................. 359/12, 15, 24, 359/28, 35, 453, 599

(56) References Cited

U.S. PATENT DOCUMENTS

| | | | | |
|---|---|---|---|---|
| 3,708,217 A | * | 1/1973 | McMahon | 359/15 |
| 5,016,953 A | * | 5/1991 | Moss et al. | 359/9 |
| 6,097,514 A | * | 8/2000 | Nishikawa | 359/12 |
| 6,288,803 B1 | | 9/2001 | Hattori et al. | |
| 2001/0001579 A1 | | 5/2001 | Kanda et al. | |
| 2001/0012140 A1 | | 8/2001 | Takabayashi et al. | |
| 2002/0154349 A1 | * | 10/2002 | Halldorsson et al. | 359/15 |

FOREIGN PATENT DOCUMENTS

| | | |
|---|---|---|
| EP | 0849649 A2 | 6/1998 |
| EP | 0971247 A1 | 1/2000 |
| JP | A-11-102153 | 4/1999 |
| JP | 11-102153 | 4/1999 |
| JP | A-2000-19937 | 1/2000 |
| JP | 2000-19937 | 1/2000 |
| JP | 2000-241888 | * 9/2000 |
| WO | WO 98/30924 | 7/1998 |

OTHER PUBLICATIONS

Patent Abstracts of Japan, vol. 2000, No. 12, Jan. 3, 2001 & JP 2000 2411888A (Denso Corp;Nippon Soken Inc), Sep. 8, 2000.

* cited by examiner

Primary Examiner—Leo Boutsikaris
(74) Attorney, Agent, or Firm—Nixon & Vanderhye PC

(57) ABSTRACT

An image display device comprising a holographic screen and an image projection device for projecting an image beam onto the holographic screen at an upward or downward angle is provided, wherein a forward view color difference Δu'v' between a chromaticity value (u', v') at the center of the holographic screen when a white image is projected onto the holographic screen by the image projection device and a standard chromaticity value (u'$_o$, v'$_o$) is 0.04 or less when the projection angle of the image beam onto the center of the holographic screen is set to any angle within a specified projection angle range of 20 to 45°, whereby a image display device and holographic screen can be provided wherein the range of the projection angle of the image beam, in which an image with excellent color reproducibility can be displayed, is wide.

20 Claims, 17 Drawing Sheets

IMAGE DISPLAY DEVICE AND HOLOGRAPHIC SCREEN

BACKGROUND OF THE INVENTION

1. Field of the Invention

The present invention relates to an image display device for projecting an image beam onto a holographic screen to display an image, and to a holographic screen for use in the same.

2. Description of the Related Art

The holographic screens disclosed in Unexamined Patent Publication (Kokai) No. 2000-19937 and Unexamined Patent Publication No. 11-102153 are holographic screens with good color reproducibility.

The above prior art holographic screens can display an image without reproduced colors that appear unnatural, by projecting images at substantially the same angle as a previously set image projection angle.

However, the allowable range of an image beam projection angle that can achieve an image with reproduced colors that appear natural on the holographic screen is narrow. As a result, when the image projection device is to be installed in a shop or the like, precision in the installation is necessary. Consequently, the installation of the image projection device is difficult and the construction time is extended. Also, there is the problem that, depending on the situation, the image projection device cannot be installed in a position that allows a projection angle that can attain good color reproducibility, due to restrictions such as ceiling height and the like.

SUMMARY OF THE INVENTION

The present invention was arrived at in light of the problems inherent in the prior art, and provides an image display device wherein the range of the projection angle of the image beam within which an image with excellent color reproducibility can be displayed is wide, and a holographic screen for use therewith.

According to a first aspect of the present invention there is provided an image display device comprising a holographic screen and an image projection device for projecting an image beam onto the holographic screen at an upward or downward angle, wherein a forward view color difference $\Delta u'v'$ between a chromaticity value $(u', v')$ at the center of the holographic screen when a white image is projected onto the holographic screen by the image projection device and a standard chromaticity value $(u'_o, v'_o)$ is 0.04 or less when a projection angle of the image beam onto the center of the holographic screen is set to any angle within a specified projection angle range of 20 to 45°.

Next, the operational effects of the present invention will be explained.

In the above image display device, when the projection angle of the image beam is set to any angle within a specified projection angle range of 20 to 45°, the color difference $\Delta u'v'$ is 0.04 or less. Consequently, even if the projection angle of the image display is changed to a relatively large degree, the color difference of the white image changes little. Accordingly, even if the projection angle of the image beam with respect to the holographic screen is not strictly set, i.e. as long as it is set within the above specified projection angle range, an image with excellent color reproducibility can be displayed.

Therefore, the above image display device allows the positional relationship between the above holographic screen and image projection device to be set relatively freely, enabling easy installation.

As described above, according to the present invention, an image display device can be provided wherein the range of the projection angle of the image beam within which an image with excellent color reproducibility can be displayed is wide.

According to a second aspect of the present invention, there is provided a holographic screen for projecting an image beam from an image projection device to display an image, wherein the holographic screen comprises a plurality of laminated holograms. Each hologram is produced by exposing a photosensitive material to an object beam serving as a diffused beam transmitted through or reflected from a light diffuser and a reference beam which is not a diffused beam. The angle of incidence of the reference beam on the center of the photosensitive material during exposure differs for each hologram.

Generally, in a hologram, if the projection angle of the image beam diverges from an angle that is the same as the angle of incidence of the reference beam, the reproduced wavelength changes. If the projection angle of the image beam is greater than the angle of incidence of the reference beam, the wavelength thereof lengthens, and if the projection angle of the image beam is less than the angle of incidence of the reference beam, the wavelength thereof shortens.

Conversely, with the projection angle of the image beam as standard, if the angle of incidence of the reference beam is smaller than the projection angle of the image beam, the wavelength thereof lengthens, as indicated by curve C in FIG. 25, and if the angle of incidence of the reference beam is greater than the projection angle of the image beam, the wavelength thereof shortens, as indicated by curve B in FIG. 25.

If the angle of incidence of the reference beam and the projection angle of the image beam diverge, although there is slight dislocation of the reproduced light diffuser and distortion and the like occur, because the light diffuser normally has a uniform diffusion surface, an observer is not aware of such dislocation, distortion and the like.

The inventor of the present invention has concentrated on the phenomenon and, in a hologram that records a light diffuser having a uniform diffusion surface, has laminated a plurality of holograms having reference beams with different angles of incidence and, by irradiating them with one image beam (i.e. one image beam projection angle), has ascertained that favorable white diffraction beams in which different wavelengths are weighted can be attained. In other words, as shown in FIG. 25, the different spectral characteristics A, B and C of peak wavelengths are superposed to produce a white image having a flat spectral characteristic as indicated by curve D in FIG. 26.

Further, it was ascertained that, because the spectral characteristic is flat even if the projection angle of the image beam is changed, changes in the reproduced color do not easily change, and a hologram having a favorable color reproducibility can be attained with a wide image beam projection angle range.

Accordingly, the holographic screen of the present invention, as described above, is formed by laminating a plurality of holograms in which the angles of incidence of the reference beams on the center of the photosensitive material differ during exposure. Therefore, even if the image beam projection angle changes, color reproducibility on the holographic screen does not change easily.

As described above, according to the present invention, a holographic screen can be provided wherein the range of the projection angle of the image beam in which an image with excellent color reproducibility can be displayed is wide.

According to a third aspect of the present invention, there is provided a holographic screen for projecting an image beam from an image projection device to display an image, wherein the holographic screen is formed by a plurality of laminated holograms. Each hologram is produced by copying a primary master, produced by exposing a master photosensitive material to an object beam serving as a diffused beam transmitted through or reflected from a light diffuser and a primary master reference beam which is not a diffused beam, by superposing it on a photosensitive material for copying and irradiating it with a reference beam for copying. The angle of incidence of the primary master reference beam on the center of the photosensitive material during exposure of the primary master differs for each hologram.

In this case also, a holographic screen that is essentially the same as that in the second aspect can be attained. Also, in the case of the present aspect, by producing a primary master once, and later copying the primary master, the same hologram can be reproduced a number of times. As a result, when a plurality of holographic screens are produced, this is effective in reducing the manufacturing cost.

As described above, according to the present invention, a holographic screen can be provided wherein the range of the projection angle of the image beam in which an image with excellent color reproducibility can be displayed, is wide.

According to a fourth aspect of the present invention, there is provided a holographic screen for projecting an image beam from an image projection device to display an image, wherein the holographic screen is formed by a hologram produced by preparing a plurality of primary masters, produced by exposing a master photosensitive material to an object beam serving as a diffused beam transmitted through or reflected from a light diffuser and a primary master reference beam which is not a diffused beam, laminating the plurality of primary masters, and copying them by superposing them on a photosensitive material for copying and irradiating them with a reference beam for copying from the primary master side. The angle of incidence of the primary master reference beam on the center of the photosensitive material during exposure differs for each primary master.

In this case, the divergence of the angle of incidence of the above reference beam for copying and that of the angle of incidence of the primary master reference beam during production of the above primary master each differ. Thereby, the reference beams for copying diffract in different directions in each of the primary masters and irradiate the photosensitive material for copying. As a result, as in the first aspect of the present invention, a holographic screen can be obtained with the same characteristics as one which is a plurality of laminated holograms, produced by reference beams whose angles of incidence differ. Also, because the holographic screen of this aspect of the present invention can be formed by a single layer hologram, this is even more cost effective to manufacture than the third aspect of the present invention.

As described above, according to the present invention, a holographic screen can be provided wherein the range of the projection angle of the image beam in which an image with excellent color reproducibility can be displayed is wide.

According to a fifth aspect of the present invention, there is provided a holographic screen for projecting an image beam from an image projection device to display an image, wherein the holographic screen is formed by a hologram produced by preparing a plurality of primary masters, produced by exposing a master photosensitive material to an object beam serving as a diffused beam transmitted through or reflected from a light diffuser and a primary master reference beam which is not a diffused beam, laminating the plurality of primary masters, and copying them by producing a secondary master by copying the plurality of primary masters by superposing them on a single layer master photosensitive material and irradiating them with a secondary master a reference beam from the primary master side, and superposing the secondary master on a photosensitive material for copying and irradiating it with a reference beam for copying from the secondary master side, and the angle of incidence of the primary master reference beam on the center of the photosensitive material during exposure differs for each primary master.

In this case also, a holographic screen that is essentially the same as that in the fourth aspect of the present invention can be attained. Also, a plurality of holograms can be produced by copying a single secondary master. Consequently, when a plurality of holographic screens are produced, because the secondary master is light, it is easy to handle. Subsequently, manufacturing of the holographic screen is easy.

As described above, according to the present invention, a holographic screen can be provided wherein the range of the projection angle of the image beam in which an image with excellent color reproducibility can be displayed is wide.

According to a sixth aspect of the present invention, there is provided a holographic screen for projecting an image beam from an image projection device to display an image, wherein the holographic screen is formed by a hologram produced by preparing a primary master, produced by exposing a master photosensitive material to an object beam serving as a diffused beam transmitted through or reflected from a light diffuser and a primary master reference beam which is not a diffused beam, and copying it by superposing the primary master on a photosensitive material for copying and irradiating it with a reference beam for copying from the primary master side, and the reference beam for copying uses a plurality of differing wavelengths.

The wavelength of the primary master reference beam during manufacture of the primary master is the same as one of the above plurality of wavelengths, or differs from all of them.

In this case, the above reference beams for copying having a plurality of wavelengths, each diffract in different directions in the primary master. Therefore, by means of the same effect as in the fourth aspect, a holographic screen can be obtained with the same characteristics as one which is a plurality of laminated holograms, produced by reference beams whose angles of incidence differ, as in the first aspect of the present invention. Also, because the holographic screen of this aspect of the present invention can be formed by a single layer hologram, an inexpensive and lightweight holographic screen can be attained.

As described above, according to the present invention, a holographic screen can be provided wherein the range of the projection angle of the image beam in which an image with excellent color reproducibility can be displayed is wide.

BRIEF DESCRIPTION OF THE DRAWINGS

The above object and features of the present invention will be more apparent from the following description of the preferred embodiments when read with reference to the accompanying drawings, wherein.

DESCRIPTION OF PREFERRED EMBODIMENTS

In the first aspect of the present invention described above, the above described chromaticity value (u', v') is a chromaticity value indicated by CIE chromaticity value coordinates. Also, a chromaticity value where the projection angle of the image beam is 30° can serve as the above standard chromaticity value (u'$_o$, v'$_o$), for example.

Further, the maximum and minimum difference $\Delta u'v'_{max}$ of the chromaticity value (u', v') distributed on the holographic screen when a white image is projected onto the holographic screen by the above image projection device is preferably 0.1 or less.

In this case, a holographic screen which has no color irregularities across the entire screen can be attained. If the above value $\Delta u'v'_{max}$ exceeds 0.1, there is the possibility that irregularities may be observed.

The maximum value of the above chromaticity value (u', v') is a chromaticity value (u', v') at a point within the holographic screen where the chromaticity value is greatest. Also, the minimum value of the above chromaticity value (u', v') is a chromaticity value (u', v') at a point within the holographic screen where the chromaticity value is smallest.

Further, the color difference $\Delta u'v'$, between a forward view and a view from any direction within a horizontal specified angle of visibility range, of a chromaticity value (u', v') at the center of the holographic screen when a white image is projected onto the holographic screen by the image projection device, is preferably 0.04 or less, and the horizontal specified angle of visibility range is preferably a range of one half or less of the value in which the screen gain is that of a forward view.

In this case, even if the holographic screen is observed from an oblique angle, an image with excellent color reproducibility can be attained.

The above described screen gain is obtained by the equation set forth below, and is used as indicator showing the efficiency of the screen.

Screen gain=(brightness×Π)/illumination

Figure 6:
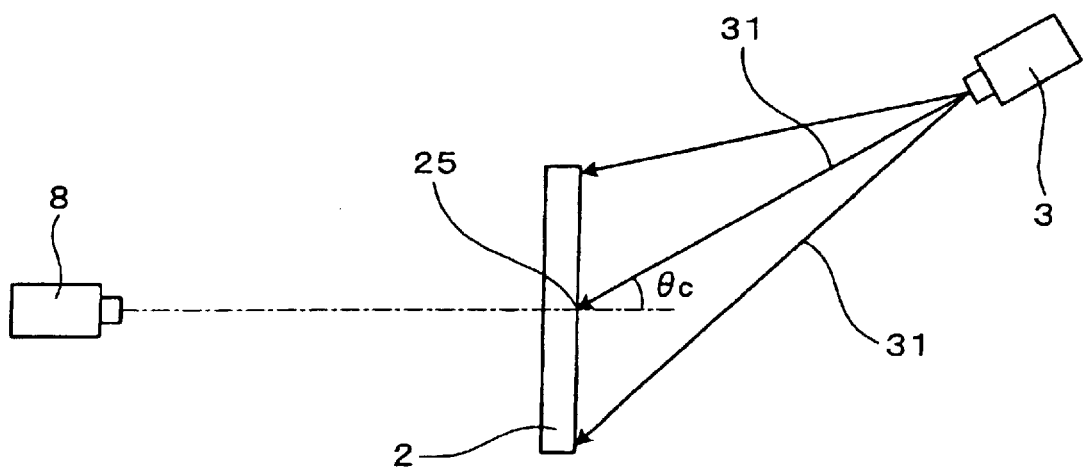
FIG. 6 is a view illustrating a chromaticity measurement method according to the first embodiment.

Measurement of this brightness is performed, as shown in FIG. 6, by projecting a white image from the image projection device 3 onto the holographic screen 2 and positioning a color/luminance meter 8 at a distance of 2 m, on a line normal to the holographic screen 2. Then, an illumination meter is placed at the center on the image projection device 3 side of the holographic screen 2 (not shown in the drawing), and the illumination is measured.

Also, half bandwidth of a spectral characteristic of a diffracted beam, produced by diffracting and outputting an image beam projected from an angle within the specified projection angle range onto the center of the holographic screen along a normal line direction, is preferably 180 nm or less.

In this case, even if the peak wavelength of the diffracted beam shifts, an image with excellent color reproducibility can be obtained. Accordingly, even if the projection angle of the image beam changes, the color reproducibility of the holographic screen does not easily decrease. If the above half bandwidth is less than 180 nm, there is a possibility that the color reproducibility will decrease if the peak wavelength of the diffracted beam shifts.

Further, the peak wavelength of the spectral characteristic of the diffracted beam is preferably within a range between 450 nm and 650 nm.

If the above peak wavelength is less than 450 nm, or exceeds 650 nm, there is a possibility of a decrease in the color reproducibility and image brightness.

Next, in the second and third aspects of the present invention, the holographic screen is preferably formed by laminating two to five layers of holograms.

In these cases, a holographic screen, wherein the range of the projection angle of the image beam in which an image with excellent color reproducibility can be displayed is wide, can be reliably provided.

If six or more of the above holograms are laminated, there is a possibility that the transmittance of the holographic screen will decrease. Also, from the same viewpoint, it is even more preferable for the number of laminated layers to be two or three.

Further, the projection angle $\theta c$ of the image beam while using the holographic screen, and the angle of incidence $\theta$ of the reference beam on the photosensitive material during production of the holograms, preferably satisfy the following equation:

$$\theta c-10°\leq\theta\leq\theta c+10°.$$

In this case, a holographic screen which can display an image with better color reproducibility can be provided. If the above condition is not met, there is the possibility that it would be difficult to improve the color reproducibility.

The above reference beam also includes a primary master reference beam. This is also so in the following aspects of the present invention.

The holographic screen is also preferably formed by laminating two holograms, and the angle of incidence $\theta 1$ of the reference beam during production of the first hologram and the angle of incidence $\theta 2$ of the reference beam during production of the second hologram among the two laminated holograms preferably satisfy the following equations:

$$\theta 1\leq\theta c\leq\theta 2,$$

$$0°\leq\theta 2-\theta c\leq 10°,$$

$$0°\leq\theta c-\theta 1\leq 10°, \text{ and}$$

$$2°\leq\theta 2-\theta 1\leq 20°.$$

In this case, a holographic screen which can display an image with better color reproducibility can be provided. If the above condition is not met, there is the possibility that it would be difficult to improve the color reproducibility.

Moreover, the holographic screen can also be preferably formed by laminating three holograms, and the angle of incidence $\theta 1$ of the reference beam during production of the first hologram, the angle of incidence $\theta 2$ of the reference beam during production of the second hologram and the angle of incidence $\theta 3$ of the reference beam during production of the third hologram among the three laminated holograms preferably satisfy one of the following equations:

$$\theta 1<\theta 3\leq\theta c\leq\theta 2, \text{ or}$$

$$\theta 1\leq\theta c\leq\theta 3<\theta 2.$$

In this case also, a holographic screen which can display an image with even better color reproducibility can be provided. If the above condition is not met, there is the possibility that it would be difficult to improve the color reproducibility.

Furthermore, the following equations are preferably satisfied:

$$0°<\theta 2-\theta c\leq 10°,$$

$$0°<\theta c-\theta 1\leq 10°, \text{ and}$$

$$2°\leq\theta 2-\theta 1\leq 20°.$$

In this case also, a holographic screen which can display an image with even better color reproducibility can be provided.

Next, in the fourth aspect of the present invention, the holographic screen is preferably produced by laminating and copying two to five layers of the primary masters.

In this case, a holographic screen, wherein the range of the projection angle of the image beam in which an image with excellent color reproducibility can be displayed is wide, can be reliably provided.

If six or more of the above primary masters are laminated, there is a possibility that the transmittance of the holographic screen will decrease. Also, from the same viewpoint, it is even more preferable for the number of laminated layers to be two or three.

Next, in the fifth aspect of the present invention, a secondary master is produced by laminating and copying two to five layers of the primary masters.

In this case, a holographic screen, wherein the range of the projection angle of the image beam in which an image with excellent color reproducibility can be displayed is wide, can be reliably provided.

If six or more of the above secondary masters are laminated, there is a possibility that the transmittance of the holographic screen will decrease. Also, from the same viewpoint, it is even more preferable for the number of laminated layers to be two or three.

Also, the projection angle $\theta c$ of the image beam while using the holographic screen and the angle of incidence $\theta$ of the primary master reference beam on the photosensitive material during production of the holograms preferably satisfy the following equation:

$$\theta c-10°\leq\theta\leq\theta c+10°.$$

In this case, a holographic screen which can display an image with better color reproducibility can be provided.

Also, two primary masters are preferably produced, and the angle of incidence $\theta 1$ of the primary master reference beam during production of the first primary master and the angle of incidence $\theta 2$ of the primary master reference beam during production of the second primary master among the two primary masters preferably satisfy the following equations:

$$\theta 1\leq\theta c\leq\theta 2,$$

$$0°<\theta 2-\theta c\leq 10°,$$

$0° < θc-θ1 ≦ 10°$, and $2° ≦ θ2-θ1 ≦ 20°$.

In this case as well, a holographic screen which can display an image with better color reproducibility can be provided.

In addition, three primary masters are preferably produced, and the angle of incidence θ1 of the primary master reference beam during production of the first primary master, the angle of incidence θ2 of the primary master reference beam during production of the second primary master, and the angle of incidence θ3 of the primary master reference beam during production of the third primary master among the three primary masters preferably satisfy the following equations:

$θ1 < θ3 ≦ θc ≦ θ2$, or $θ1 ≦ θc ≦ θ3 < θ2$.

In this case also, a holographic screen which can display an image with better color reproducibility can be provided.

Further, the following equations are preferably satisfied:

$0° < θ2-θc ≦ 10°$, $0° < θc-θ1 ≦ 10°$, and $2° ≦ Θ2-θ1 ≦ 20°$.

In this case, a holographic screen which can display an image with even better color reproducibility can be provided.

Moreover, the primary master reference beam, secondary master reference beam and reference beam for copying are preferably formed by single wavelength laser beams.

In this case, a holographic screen with high diffraction efficiency can be produced.

Next, in the sixth aspect of the present invention, the reference beam for copying preferably uses two to five types of wavelengths.

In this case, a holographic screen, wherein the range of the projection angle of the image beam in which an image with excellent color reproducibility can be displayed is wide, can be reliably provided.

If there are six or more wavelengths, there is a possibility that the transmittance of the holographic screen will decrease. Also, from the same viewpoint, it is even more preferable for the number of wavelengths to be two or three.

The holographic screen is also preferably produced by preparing a plurality of said primary masters, laminating the plurality of primary masters and copying them onto the photosensitive material for copying, and the angle of incidence of the primary master reference beam on the center of the photosensitive material during exposure preferably differs for each of the plurality of primary masters.

In this case, a holographic screen which can display an image with better color reproducibility can be provided.

Also, the primary master reference beam and reference beam for copying are preferably formed by single wavelength laser beams.

In this case, there is the advantage that the angle of incidence of the above differing primary master reference beam can be easily determined.

In addition, the holographic screen is preferably a transmission holographic screen.

In this case, because the diffracted beam which has been produced by projecting and diffracting the image beam is color diffused and can attain a broad spectral characteristic, a holographic screen, wherein the range of the projection angle of the image beam in which an image with excellent color reproducibility can be displayed is wide, can be provided.

First Embodiment

The image display device and holographic screen used therewith according to an embodiment of the present invention will be explained using FIGS. 1 to 6.

Figure 1:
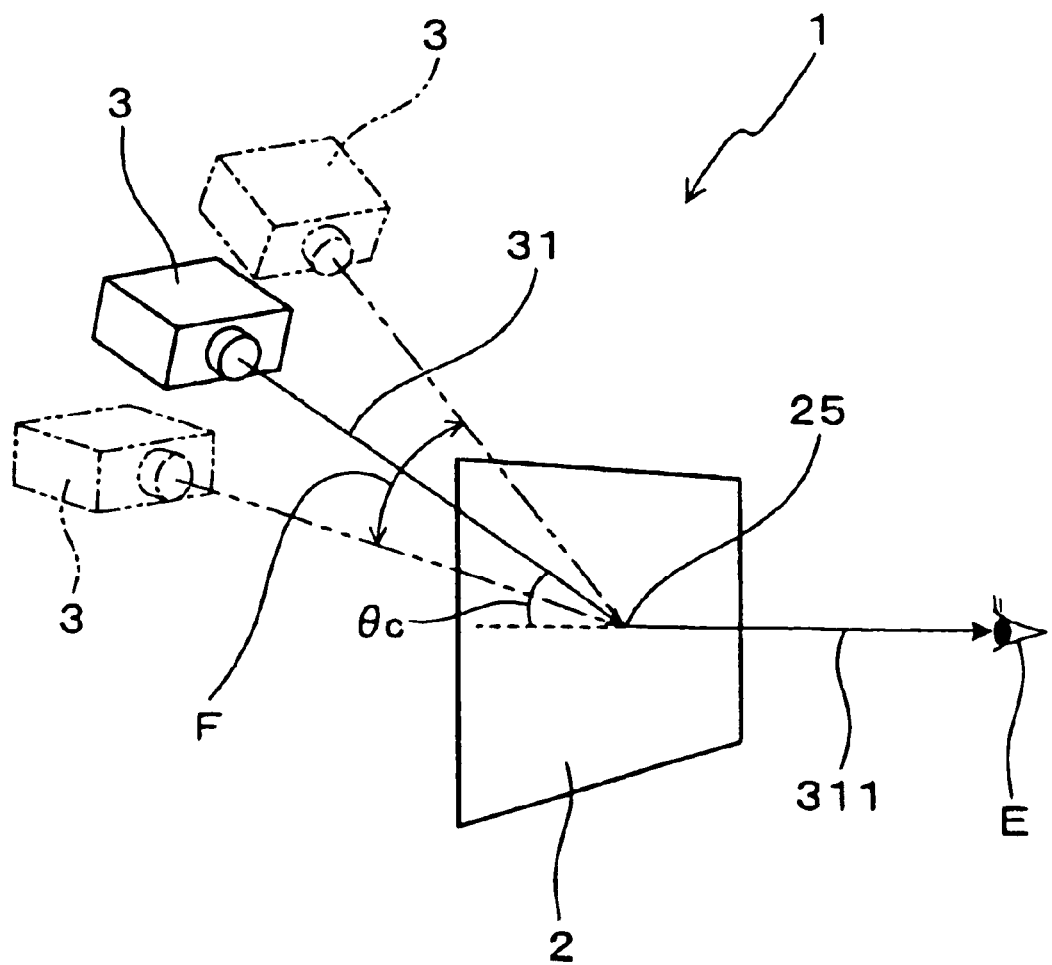
FIG. 1 is a perspective view of the image display device according to a first embodiment of the present invention.

The image display device 1 of the present embodiment, as shown in FIG. 1, has a holographic screen 2 and an image projection device 3 for projecting an image beam 31 obliquely from an upward direction onto the holographic screen.

Here, a chromaticity value at the center 25 of the holographic screen 2 when a white image is projected onto the holographic screen 2 by the image projection device 3 is indicated by (u', v'). A color difference value from a forward view (looking from the point of the reference symbol E in FIG. 1) between a chromaticity value (u', v') and a standard chromaticity value $(u'_o, v'_o)$ is indicated by Δu'v'. At this time, the color difference Δu'v' is 0.04 or less when the projection angle of the image beam 31 onto the center 25 of the holographic screen 2 is set to any angle within a specified projection angle range (reference symbol F) between 20° and 45° (refer to FIG. 7).

The above color difference value, as shown in FIG. 6, is measured using a color/luminance meter (Topcon BM-7). In other words, a white image is projected onto the holographic screen 2 from the image projection device 3, and the color/luminance meter 8 is positioned along a normal line from the holographic screen 2 at a distance of 2 m to measure the chromaticity value (u', v').

As the above standard chromaticity value $(u'_o, v'_o)$, the chromaticity value (u', v') when the projection angle of the image beam 31 is at an angle of 30° is used.

The holographic screen 2 in the above image display device 1 having the above characteristics is formed from the following structure.

Figure 2:
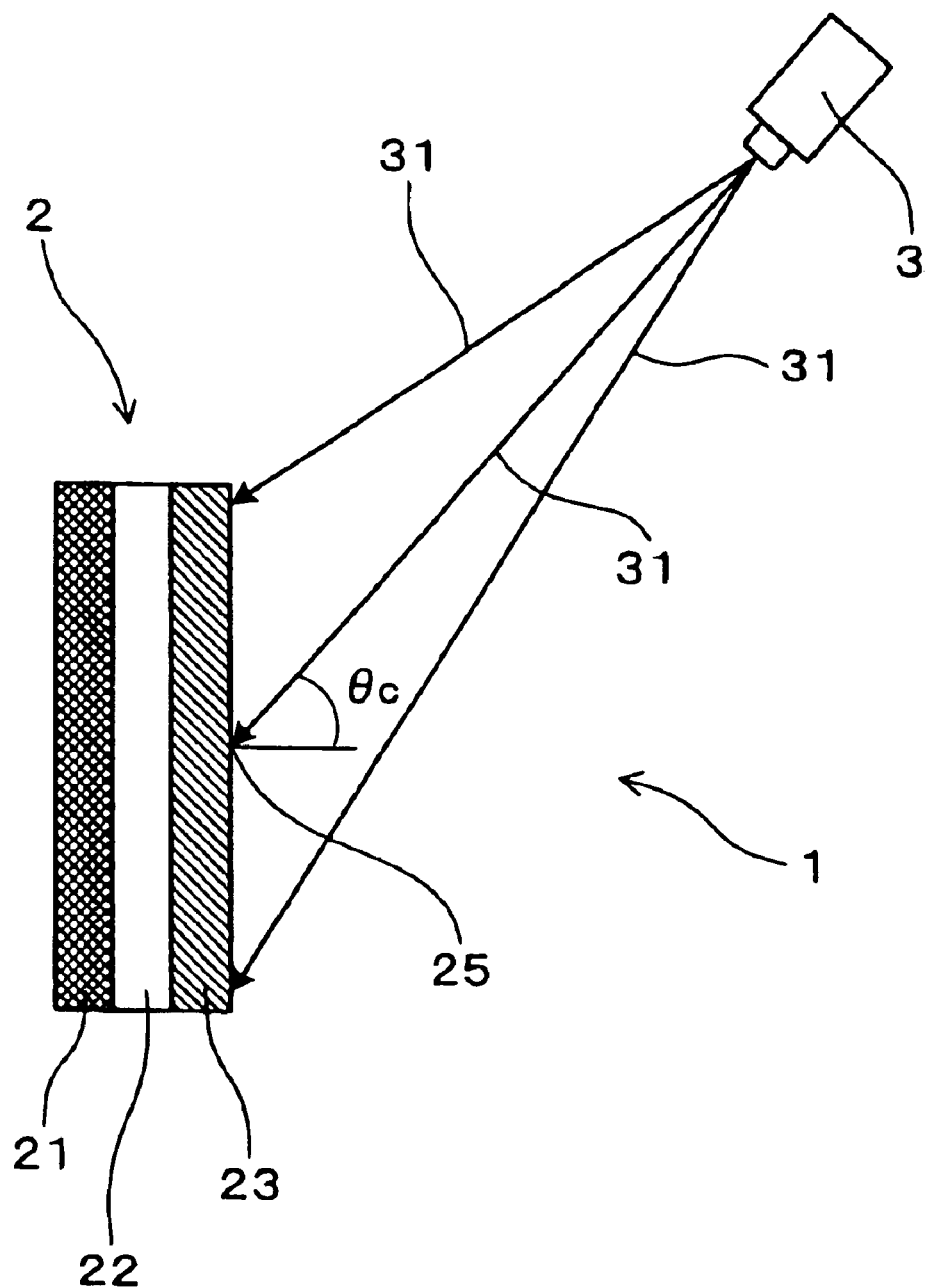
FIG. 2 is a longitudinal sectional view of the image display device according to the first embodiment.

The holographic screen 2 of the present embodiment, as shown in FIG. 2, is formed by laminating three holograms 21, 22 and 23.

Figure 3A:
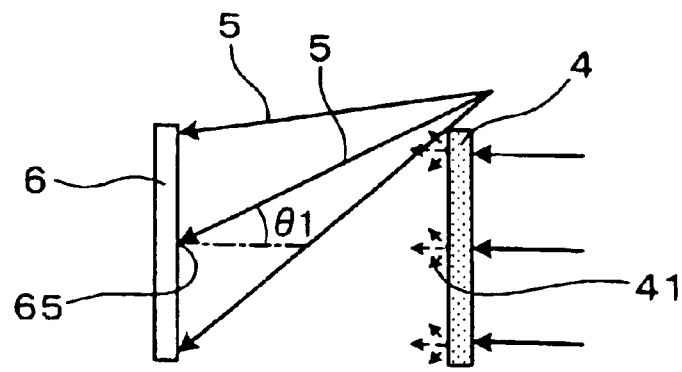
FIGS. 3A to 3C are partial views illustrating the hologram production method according to the first embodiment.
Figure 3B:
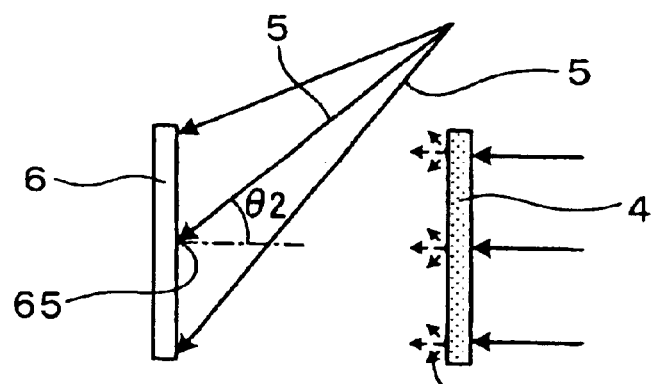
Figure 3C:
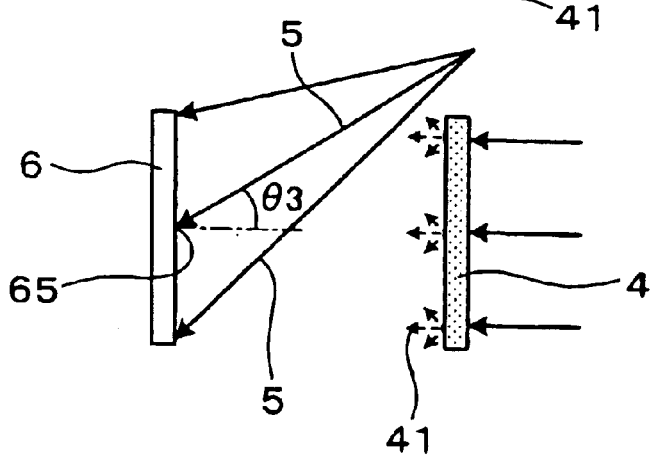
Figure 4:
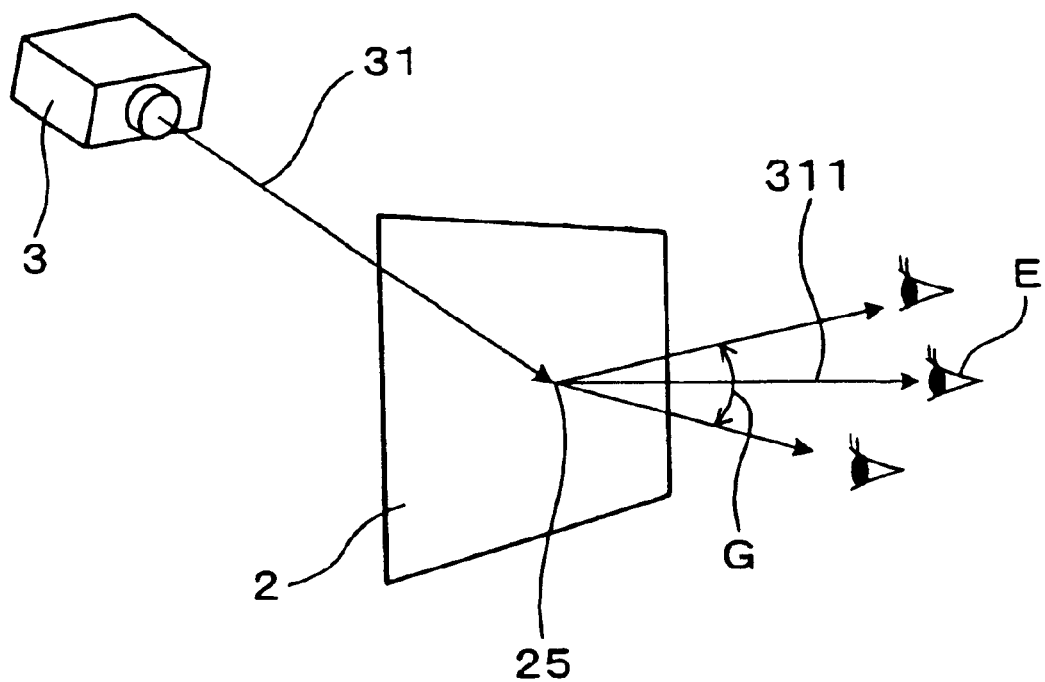
FIG. 4 is perspective view of the image display device according to the first embodiment.

Each hologram 21, 22 and 23, as shown in FIGS. 3A to 3C, is produced by exposing a photosensitive material 6 by means of an object beam 41 as a diffusion beam transmitted through a light diffuser 4 and a reference beam 5 which is a non-diffused beam. Also, the angles of incidence θ1, θ2 and θ3 of the reference beams 5 on the center 65 of the photosensitive material 6 when it is exposed differ for each of the holograms 21, 22 and 23.

In other words, among the three holograms that form the above holographic screen 2, the angle of incidence of the reference beam 5 when the first hologram 21 is produced is θ1, the angle of incidence of the reference beam 5 when the second hologram 22 is produced is θ2, and the angle of incidence of the reference beam 5 when the third hologram 23 is produced is θ3.

The above values θ1, θ2 and θ3, in their relationship with projection angle θc (in FIG. 2) of the image beam 31 when the above holographic screen 2 is used, satisfy the equation:

$$θ1 < θ3 ≦ θc ≦ θ2, \text{ or } θ1 ≦ θc ≦ θ3 < θ2 \tag{1}$$

Further, θ1 and θ2 satisfy the following equations:

$$0° < θ2-θc ≦ 10° \tag{2}$$

$$0° < θc-θ1 ≦ 10° \tag{3}$$

$$2° ≦ θ2-θ1 ≦ 20° \tag{4}$$

Specifically, θ1=25°, θ2=35° and θ3=30°, for example.

Also, the above holographic screen 2 is a transmission holographic screen.

Further, the image display device 1 has the following additional characteristics.

Figure 8:
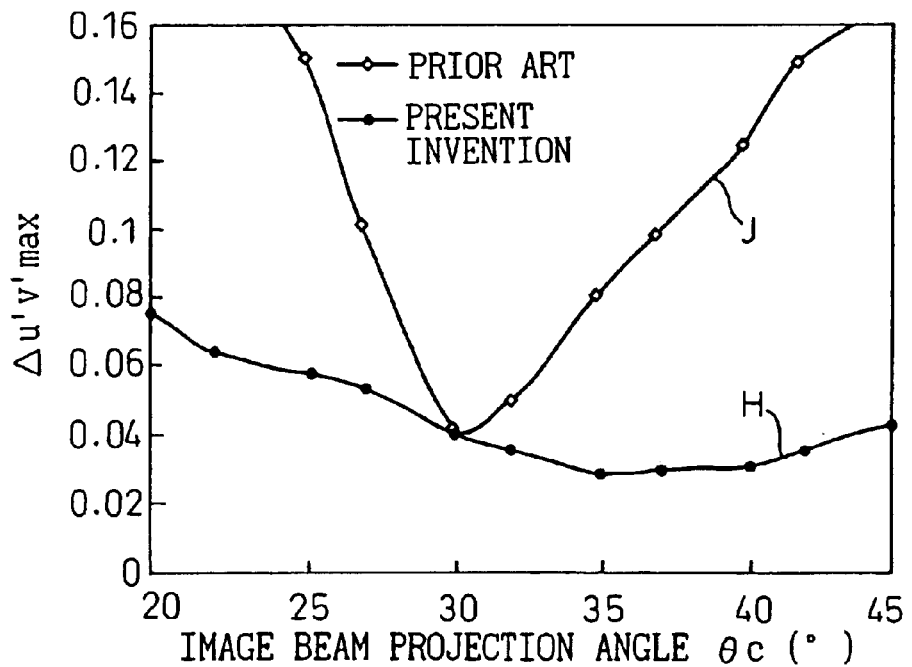
FIG. 8 is a chart illustrating changes in color irregularities ($\Delta u'v'_{max}$) with respect to changes in the projection angle of the image beam, in the first embodiment.

That is, when a white image is projected onto the holographic screen 2 by the image projection device 3, the maximum and minimum difference $\Delta u'v'_{max}$ of the chromaticity value (u', v') distributed across the holographic screen 2 is 0.1 or less (refer to FIG. 8).

Figure 9:
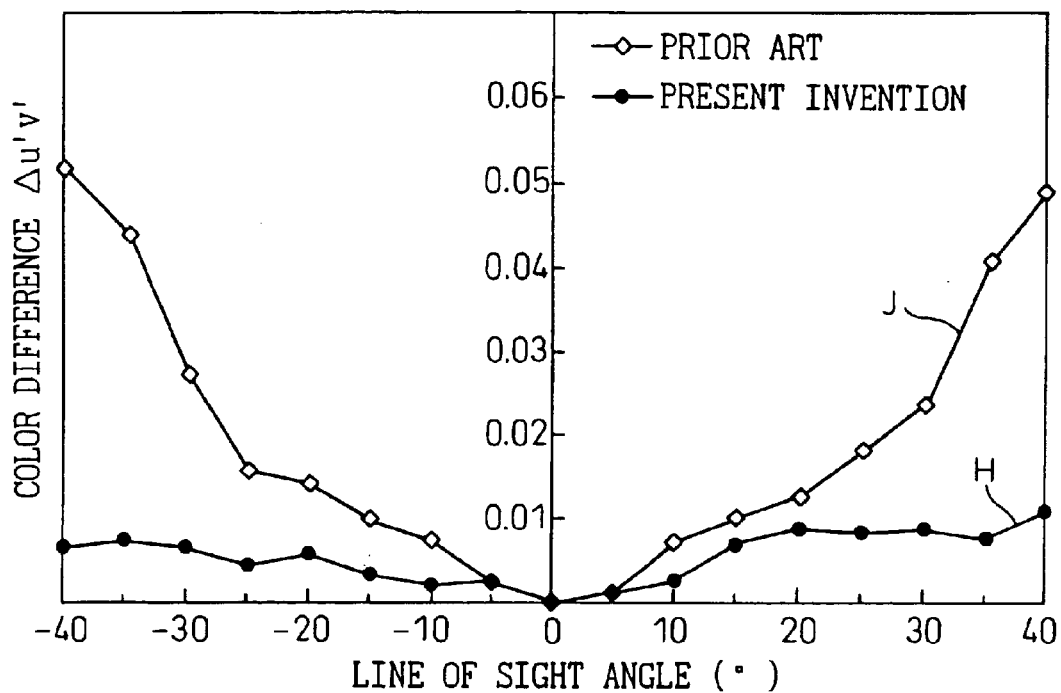
FIG. 9 is a chart illustrating changes in color difference $\Delta u'v'$ with respect to changes in line of sight angle, in the first embodiment.

Also, the color difference Δu'v' of a chromaticity value (u', v') at the center 25 of the holographic screen 2 when the white image is projected onto the holographic screen 2 by the image projection device 3, between the case of a forward view (when looking from reference symbol E in FIG. 4) and the case of a view from any given direction within a longitudinal specified angle of visibility range (reference symbol G in FIG. 4), is 0.04 or less (refer to FIG. 9). The longitudinal specified angle of visibility range is a range of one half or less with respect to a value in a case where the screen gain is that of the forward view; for example, in the holographic screen represented by the reference symbol H in FIGS. 7 to 9, it is the range of 30° towards the right and 30° towards the left.

Moreover, half bandwidth of the spectral characteristic of a diffracted beam 311 (FIG. 1) produced by diffracting the image beam 31, projected within the projection angle range of 20° to 45° onto the center 25 of the holographic screen 2, along a line normal to the holographic screen and outputting it, is 180 nm or less.

Further, the peak wavelength of the spectral characteristic of the diffracted beam 311 is within a range between 450 nm and 650 nm.

The holographic screen 2 of the present embodiment is, more specifically, produced by the following method.

Figure 5:
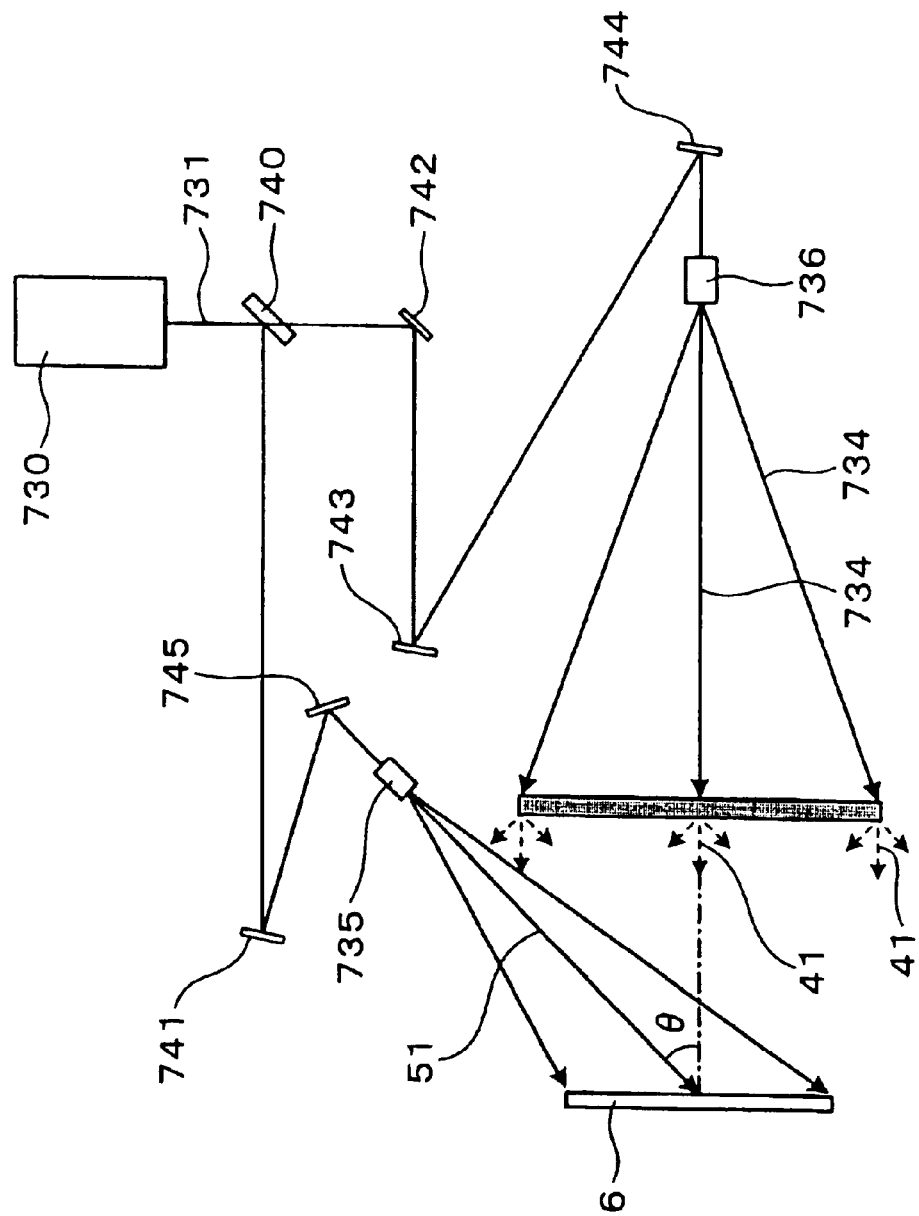
FIG. 5 is a view illustrating a hologram exposure optical system according to the first embodiment.

That is, the holograms 21, 22 and 23 in the above holographic screen 2 are exposed in the exposure optical system shown in FIG. 5.

The reference beam 5 irradiates the photosensitive material 6 in the following manner. That is, a beam 731 which is an argon laser with a wavelength of 514 nm generated by a laser oscillator 730 is guided by mirrors 740, 741 and 745, so that it is incident on an objective lens 735 (an Olympus MDPlan50). Consequently, it is incident on the photosensitive material 6 as divergent beams with an irradiation range of 1700 mm incident at predetermined angles (25°, 30° and 35°) on the center 65 of the photosensitive material 6.

Also, the object beam 41 irradiates the photosensitive material 6 in the following manner. That is, the beam 731 which is an argon laser with a wavelength of 514 is guided by mirrors 742, 743 and 744 so that it is incident on an objective lens (an Olympus MDPlan50, for example). Consequently, after it has been split into divergent beams 734, it is transmitted through the light diffuser 4 and diffused, and is then incident on the photosensitive material 6. As the light diffuser 4, four laminated layers of #1000 ground glass were used.

As the photosensitive material 6, DuPont photopolymer HRF600X was used. The size of the photosensitive material 6 was 800 mm×600 mm.

In the above exposure optical system, after the photosensitive material 6 is irradiated by a laser beam at 30 mJ/cm², it is irradiated by UV light (365 nm) at 0.1 J/cm² and is thermally processed at 140° for 30 minutes. Thereafter, a transparent polyethylene terephthalate film produced by LINTEC Corporation is adhered thereto to form the holograms 21, 22 and 23.

Thereafter, the holograms 21, 22 and 23 are adhered to each other by an adhesive film produced by LINTEC Corporation to form the holographic screen 2.

Next, the operational effects of the present embodiment will be explained.

Figure 7:
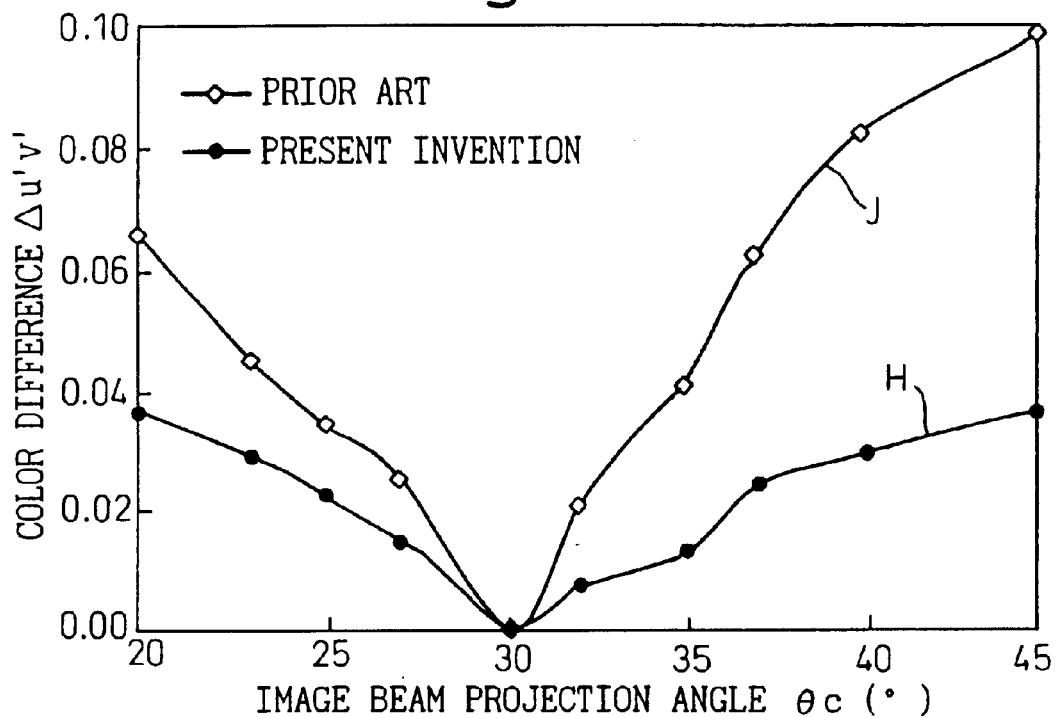
FIG. 7 is a chart illustrating changes in color difference $\Delta u'v'$ with respect to changes in the projection angle of the image beam, in the first embodiment.

In the image display device 1, when the angle of the image beam 31 is set to any angle within the projection angle range of 20° to 45°, the color difference Δu'v' is 0.04 or less (refer to FIG. 7). As a result, even if the projection angle of the image beam 31 changes to relatively large extent, the change in the color difference of the white image is small. Accordingly, even if the projection angle of the image beam 31 with respect to the holographic screen is not strictly set, i.e. as long as it is set within the above specified projection angle range, an image with excellent color reproducibility can be displayed.

Therefore, the above image display device 1 is such that the positional relationship of the image projection device 3 to the holographic screen 2 can be relatively freely set, so that installation is easy.

Also, when the white image is projected onto the holographic screen 2, the maximum and minimum difference $\Delta u'v'_{max}$ of the chromaticity value (u', v') distributed across the holographic screen 2 is 0.1 or less (refer to FIG. 8). Thus, a holographic screen 2 without any color irregularities across the entire screen can be achieved.

Further, the color difference Δu'v' of a chromaticity value (u', v') at the center 25 of the holographic screen 2, when the white image is projected onto the holographic screen 2, between a forward view (when looking from reference symbol E in FIG. 4) and a view from any given direction within the longitudinal specified angle of visibility range (reference symbol G in FIG. 4), is 0.04 or less (refer to FIG. 9). Thus, even when the holographic screen 2 is observed from a oblique angle to the right or left, an image with excellent color reproducibility can be attained.

Moreover, half bandwidth of the spectral characteristic of a diffracted beam 311 produced by diffracting the image beam 31, which is projected from an angle within the above specified projection angle range onto the center 25 of the holographic screen 2, along a normal line from the holographic screen and outputting it, is 180 nm or less. Therefore, even if the peak wavelength of the above diffracted beam 311 shifts, an image with excellent color reproducibility can be attained. Accordingly, even if the projection angle of the image beam 31 changes, the color reproducibility of the holographic screen 2 is not easily reduced.

Further, the peak wavelength of the spectral characteristic of the diffracted beam 311 is within a range between 450 nm and 650 nm, therefore it is even more difficult for the color reproducibility of the holographic screen 2 to be reduced.

Next, the operational effects of the holographic screen 2 having the above structure will be explained.

The holographic screen 2, as described above, is formed by laminating a plurality of holograms 21, 22 and 23 in each of which the angle of incidence of the reference beam 5 on the center 65 of the photosensitive material 6, when exposed, differs. As a result, by irradiation with one image beam 31 (that is, one projection angle of the image beam), a favorable white diffraction beam with weighted differing wavelengths can be attained. Also, even if the projection angle θc of the image beam 31 changes, the reproduced color does not easily change and a holographic screen 2 with favorable color reproducibility over a wide projection angle range can be attained.

In addition, because the holographic screen 2 is formed by laminating three layers of holograms 21, 22 and 23, the range of the projection angle of the image beam 31 within which an image with excellent color reproducibility can be displayed can be reliably widened.

Also, the angles of incidence θ1, θ2 and θ3 of the reference beams during manufacture of each of the holograms 21, 22 and 23 in the above holographic screen 2 satisfy the above equations (1) to (4).

As a result, a holographic screen which can display an image with better color reproducibility can be provided.

As described above, according to the present embodiment, an image display device and holographic screen can be provided, with a wide image beam projection angle range in which an image with excellent color reproducibility can be displayed.

FIRST EXPERIMENTAL EXAMPLE

The present embodiment was confirmed by a practical experiment with respect to the various characteristics of the image display device 1 and holographic screen 2 of the first embodiment, as shown in FIGS. 7 to 9.

The angles of incidence θ1, θ2 and θ3 of the reference beam 5 on the center 65 of the photosensitive material 6 during manufacture of the three hologram layers 21, 22 and 23 that form the holographic screen 2 are set respectively to 25°, 35° and 30°.

Firstly, as shown in FIG. 7, changes in the hue of the image (white screen) displayed on the holographic screen 2 when the projection angle θc of the image beam 31 from the image projection device 3 was changed (refer to FIG. 1) were investigated. In other words, using a image beam 31 projection angle θc of 30° as standard, the amount of change in the hue [chromaticity value (u', v')] with respect thereto was represented by color difference Δu'v'. As a measurement value, the value at a forward viewpoint at the center 25 of the holographic screen 2 was used.

In FIG. 7, for comparison purposes, the amount of change in hue where an image beam was projected onto a single phase holographic screen produced by the prior art was shown. Also, in FIG. 7, the reference symbol H indicates the measurement result of the device of the present invention (first embodiment), and the reference symbol J represents the measurement result of the prior art device. These reference symbols represent the same in FIGS. 8 and 9.

As can be understood from FIG. 7, it was confirmed that the device of the present invention has a much lower color change than the device of the prior art, and that the projection angle range has been greatly expanded. That is, as long as the color difference Δu'v' was not exceeded, the unnatural feeling arising from a change in hue did not occur, therefore it can be understood that the image beam 31 can be used within a projection angle range on the order of 20 to 45°.

Also, the color difference Δu'v' with respect to the chromaticity of the white image of the image projection device 3 was improved to 0.015 in the case of the present invention with respect to the prior art value of 0.025, where the projection angle was 30°.

Next, as indicated in FIG. 8, changes in the surface distribution of chromaticity when the projection angle θc of the image beam 31 was changed and a white image projected are shown. FIG. 8 shows differences $\Delta u'v'_{max}$ between the maximum value and minimum value of the chromaticity values (u', v') distributed across the surface of the screen.

As can be understood from FIG. 8, in the prior art device, if the projection angle θc diverges from the angle of incidence (30°) of the reference beam 5, $\Delta u'v'_{max}$ suddenly increases. In other words, color inconsistency, where the white image has a gradation of yellow to blue from the bottom edge to the top edge of the holographic screen, is strong.

With respect to this, the present invention has a uniform hue throughout. In other words, as can be understood from FIG. 8, even if the projection angle θc of the image beam is changed, the amount of change in $\Delta u'v'_{max}$ is small, and accordingly changes in color consistency are small. As a result, it can be understood that the angle range in which the image beam 31 can be projected is expanded and a favorable holographic screen 2 can be achieved.

Next, as shown in FIG. 9, with the projection angle θc of the image beam 31 set at 30°, changes in hue at the center 25 of the holographic screen 2 in a case where the observer's observation position of the white screen was changed, i.e. where the white screen was observed from a variety of horizontal observation angles (refer to FIG. 4), were examined. FIG. 9 shows color differences Δu'v' with respect to chromaticity values (u', v') where the above holographic screen 2 was seen from the front.

As can be understood from FIG. 9, the amount of change in hue (color difference Δu'v') at observation angles of −40° to +40° (40° on the left to 40° on the right) with respect to the present invention was on the order of 0.01, to the extent that from an observation viewpoint changes in hue could not be recognized to any significant extent. In the prior art device, changes in hue could be recognized by an observer at an angle of 30°, to the left and the right, where the color difference Δu'v' suddenly increased, and at angles where the color difference Δu'v' exceeded 0.04 the colors appeared unnatural.

Figure 10:
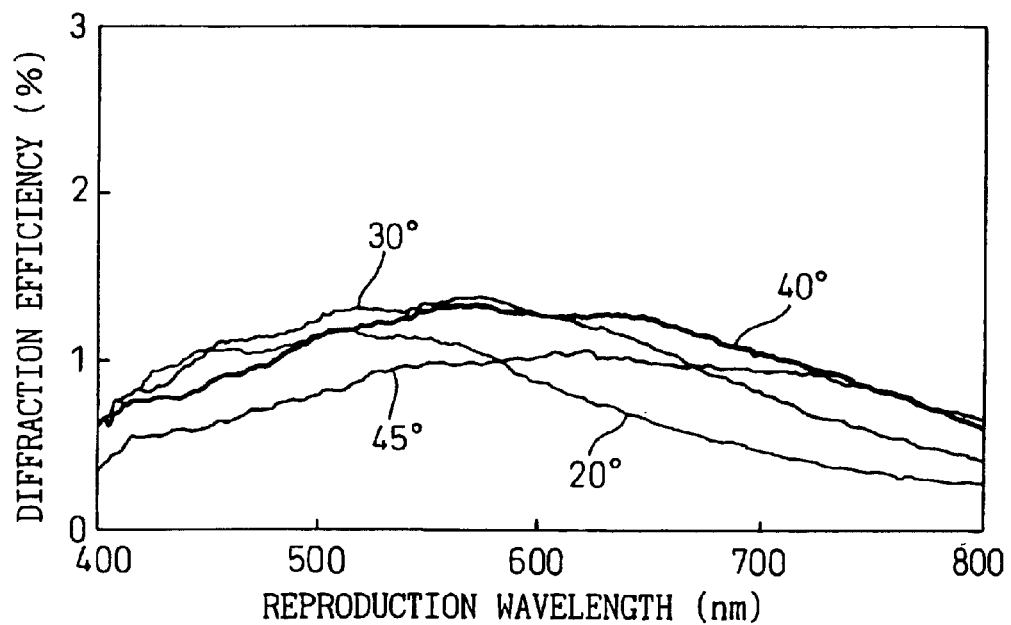
FIG. 10 is a chart illustrating changes in spectral characteristics with respect to changes in line of sight angle, in the first embodiment.

Next, the distribution characteristic of the holographic screen 2 of the present invention is shown in FIG. 10. The projection angle of the image beam 31 was changed through 20° to 45°. Since half the width of the distribution characteristic was 200 nm and above at any projection angle, even if the peak wavelength shifts, the amount of change in the hue was small, as shown in FIG. 7.

The indicators "20°", "30°", "40°" and "45°" shown in FIG. 10 indicate the projection angles of the image beam 31, and the curves of each of these indicators indicate the distribution characteristic of the holographic screen 2 in the case of each of these projection angles.

Second Embodiment

The present embodiment, as shown in FIGS. 11A to 11C and 12A to 12C, is a holographic screen 2 produced by primary master copies 201, 202 and 203 of the three laminated holograms 21, 22 and 23.

Figure 11A:
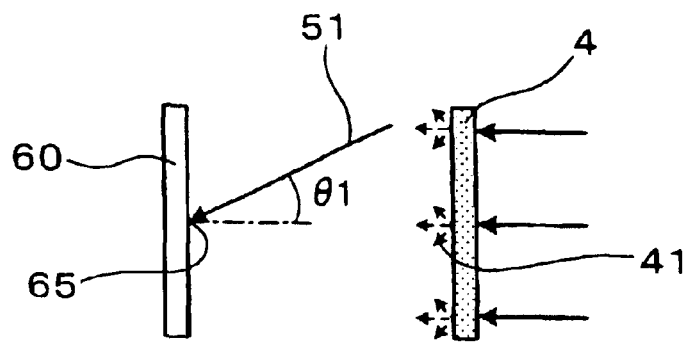
FIGS. 11A to 11C are partial views illustrating the manufacturing method of a primary master in a second embodiment of the present invention.
Figure 11B:
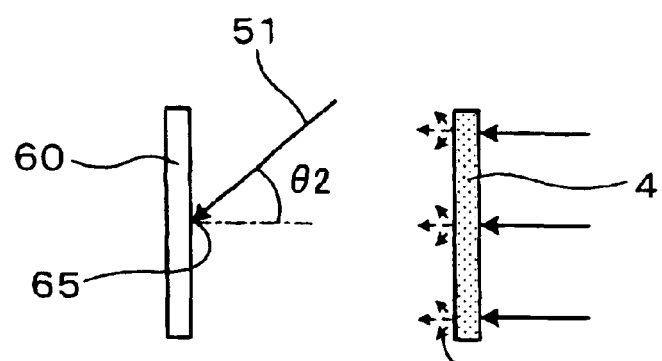
Figure 11C:
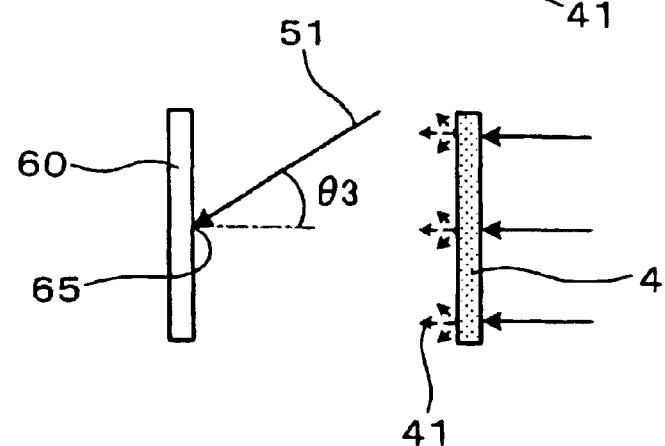
Figure 12A:
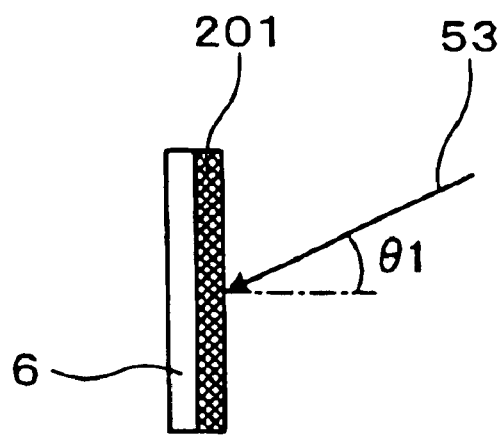
FIGS. 12A to 12C are partial views illustrating the hologram production method according to the second embodiment.
Figure 12B:
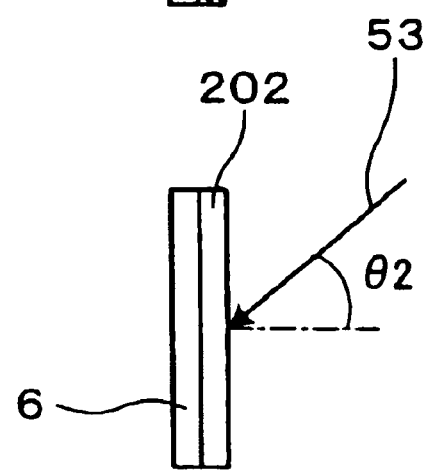
Figure 12C:
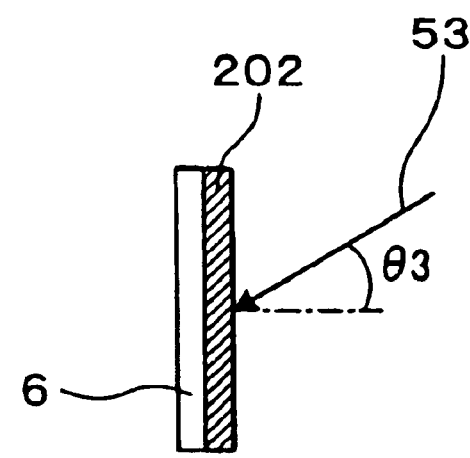

In other words, as shown in FIGS. 11A to 11C, using the same method as that used to produce the holograms in the first embodiment above, a master photosensitive material 60 is exposed to an object beam 41 and a primary master reference beam 51 to produce primary masters 201, 202 and 203. These primary masters 201, 202 and 203, as shown in FIGS. 12A to 12C, are superposed on a photosensitive material 6 for copying and irradiated with a reference beam for copying 53.

In FIGS. 11A to 11C and FIGS. 12A to 12C, although only the beams (primary master reference beam 51 and reference beams for copying 53) incident on the centers 65 of the photosensitive materials 60 and 6 are described, in actuality, as shown in FIG. 3, the beam irradiates the front surfaces of the photosensitive materials 60 and 6. This is also true for FIGS. 13 to 15 and FIGS. 19 to 24 described hereafter.

As shown in FIGS. 11A to 11C, the angles of incidence θ1, θ2 and θ3 of the primary master reference beam 51 on the center 65 of the photosensitive material 60 during exposure differ for each of the primary masters 201, 202 and 203 of the holograms 21, 22 and 23. Also, as shown in FIGS. 12A and 12C, the angles of incidence of the reference beam for copying 53 when producing each of the above holograms 21, 22 and 23 are the same as the above angles θ1, θ2 and θ3.

In addition, the conditions of the above θ1, θ2 and θ3 are the same as those described in the first embodiment.

The primary masters 201, 202 and 203, similarly to the holograms 21, 22 and 23 of the first embodiment, are produced by the exposure optical system shown in FIG. 5. FIGS. 11A to 11C show part of the exposure optical system.

Also, the master photosensitive material 60 serves as the primary masters 201, 202 and 203 in a state where it is adhered to transparent glass (not shown), exposed, and irradiated by UV light.

Everything else is the same as in the first embodiment.

In this case also, a holographic screen 2 that is essentially the same as that of the first embodiment is attained. Also, in the case of the present embodiment, by firstly producing the primary masters 201, 202 and 203 with a holographic optical system, and thereafter copying the primary masters 201, 202 and 203, the same holograms 21, 22 and 23 can be produced a number of times. As a result, where a plurality of holographic screens 2 are required, this is effective in terms of manufacturing cost.

The operational effects of the present embodiment are otherwise the same as those of the first embodiment.

Third Embodiment

Figure 13:
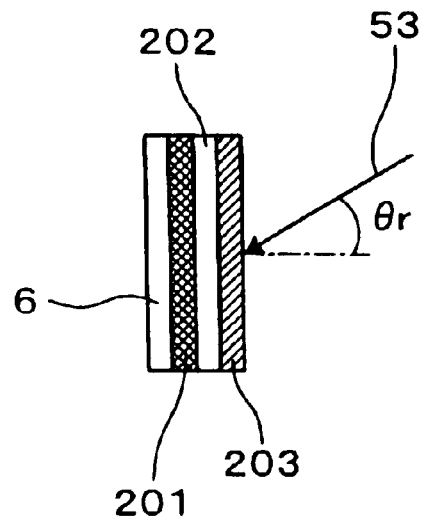
FIG. 13 is a partial view illustrating the hologram production method according to a third embodiment of the present invention.
Figure 14:
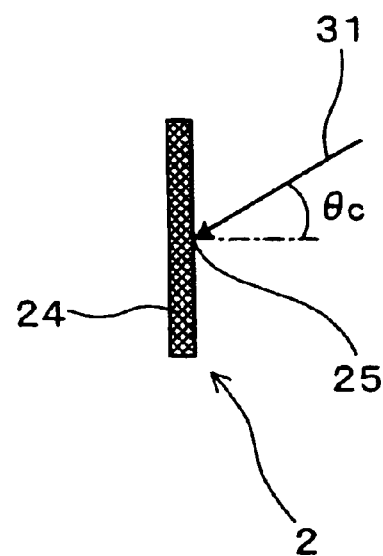
FIG. 14 is a view illustrating the holographic screen of the third embodiment.

The present embodiment, as shown in FIGS. 13 and 14, is a holographic screen 2 formed not only by laminating three primary master 201, 202 and 203 as shown in the second embodiment, but also from a hologram 24 produced by superposing these over a photosensitive material 6 for copying and irradiating this with a reference beam for copying 53 from the primary master side.

The angle of incidence θr of the reference beam for copying 53 on the center 65 of the photosensitive material 6 is 30°.

Also, the incident light distance of reference beam for copying 53 is substantially the same as the projection distance of the image projection device 3, specifically 170 cm. Further, the size of the primary masters 201, 202 and 203 is 60 cm high by 80 cm wide, with a diagonal measurement of 40 inches. An argon laser with a wavelength of 514 nm is used as the reference beam for copying 53. A photopolymer material HRF600X by DuPont is used as the photosensitive material 6, and the amount of exposure thereof is 30 mJ/cm².

Thereafter, the photosensitive material 6 is separated from the primary masters 201, 202 and 203, irradiated by UV light, and then heated to 140° C. for 60 minutes to obtain a hologram 24 (FIG. 14).

The wavelength 514 nm of the reference beam for copying 53 is the same as the wavelength of the primary master reference beam 51 used when producing the primary masters 201, 202 and 203.

Everything else is the same as in the first embodiment.

In this case, the displacement of the projection angle θr of the reference beam for copying 53 and the projection angles θ1, θ2 and θ3 of the primary master reference beam 51 when producing each of the primary masters 201, 202 and 203 differ in each case. Consequently, the reference beam for copying 53 is diffracted in differing directions for each of the primary masters 201, 202 and 203 to irradiate the photosensitive material 6 for copying. As a result, a holographic screen 2 having the same characteristics as one formed by laminating a plurality of holograms produced by reference beams with differing angles of incidence, as shown in the first embodiment, can be achieved.

In addition, because the holographic screen 2 of the present embodiment, as shown in FIG. 14, can be formed by a single hologram 24, a holographic screen 2 which is inexpensive and lightweight can be attained.

Also, upon verifying the characteristics of the holographic screen 2 of the present embodiment, characteristics which are essentially the same as those exhibited in the first experimental example (FIG. 7, FIG. 8 and FIG. 9) were obtained.

Further, the wavelength of the reference beam for copying 53 and the angle of incidence θr of the reference beam can be modified to adjust hue. Even if such changes are carried out, there is no substantial change in the characteristics of the holographic screen with respect to the projection angle of the image beam 31 and the observation angle.

All other operational effects are the same as those of the first embodiment.

Fourth Embodiment

Figure 15:
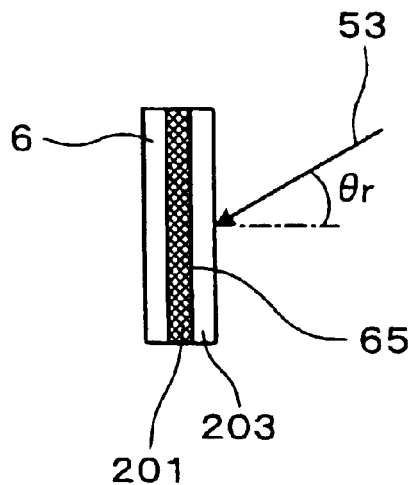
FIG. 15 is a partial view illustrating the hologram production method according to a fourth embodiment of the present invention.

The present embodiment, as shown in FIG. 15, is an embodiment that produces a holographic screen 24 in which the number of laminated primary masters has been reduced to two from the number used in the third embodiment.

That is, the two primary masters 201 and 202 of the third embodiment are used, and the reference beam for copying 53 is incident on the center 65 of the photosensitive material 6 at an angle of θr=30°.

Everything else is the same as in the third embodiment.

Figure 16:
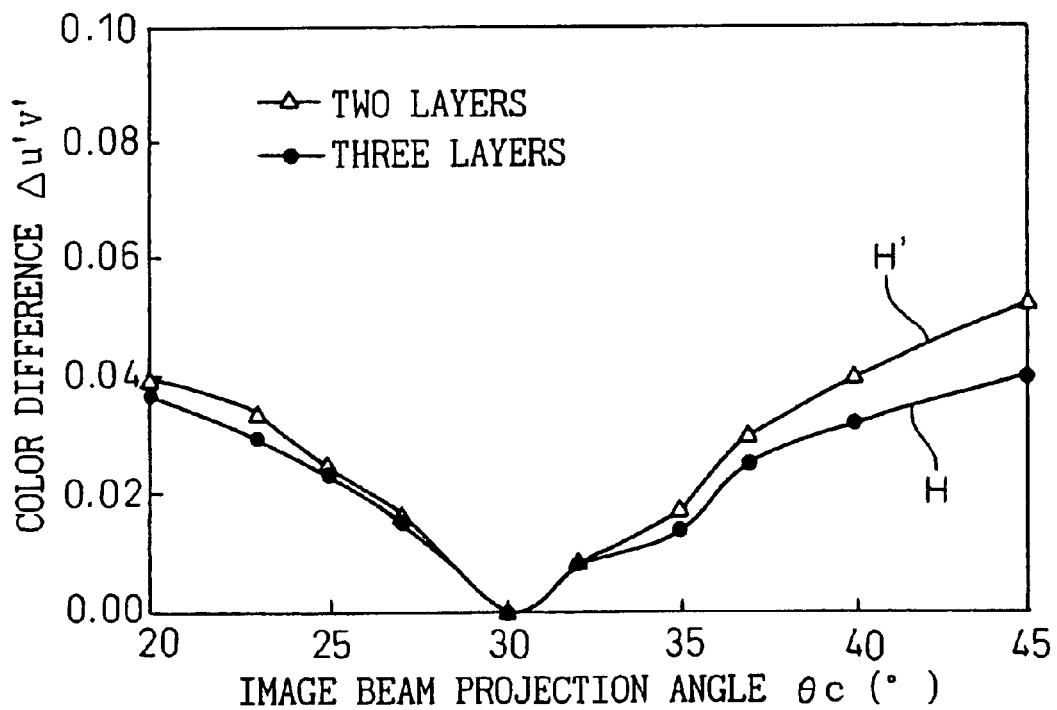
FIG. 16 is a chart illustrating changes in color difference $\Delta u'v'$ with respect to changes in the projection angle of the image beam, in the fourth embodiment.
Figure 17:
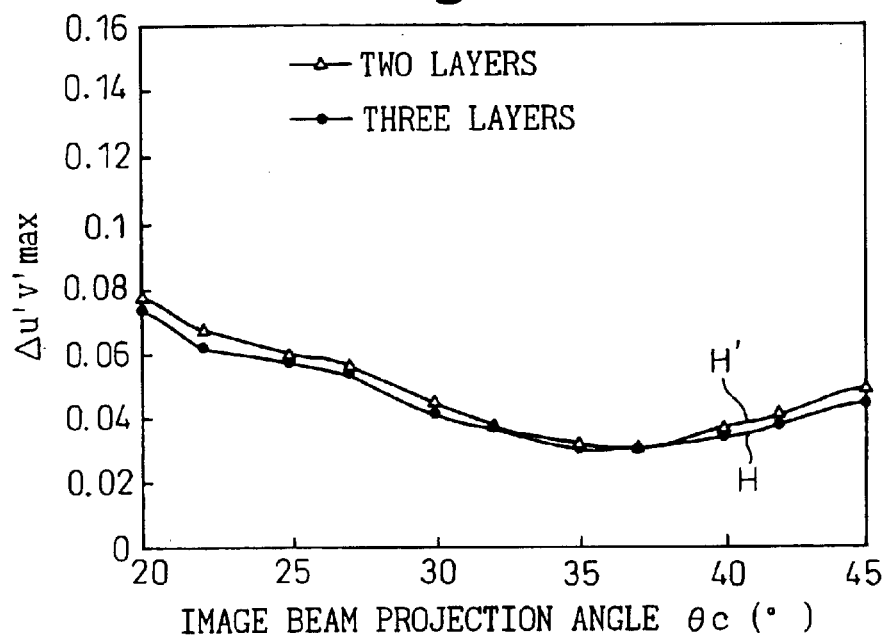
FIG. 17 is a chart illustrating changes in color irregularities ($\Delta u'v'_{max}$) with respect to changes in the projection angle of the image beam, in the fourth embodiment.
Figure 18:
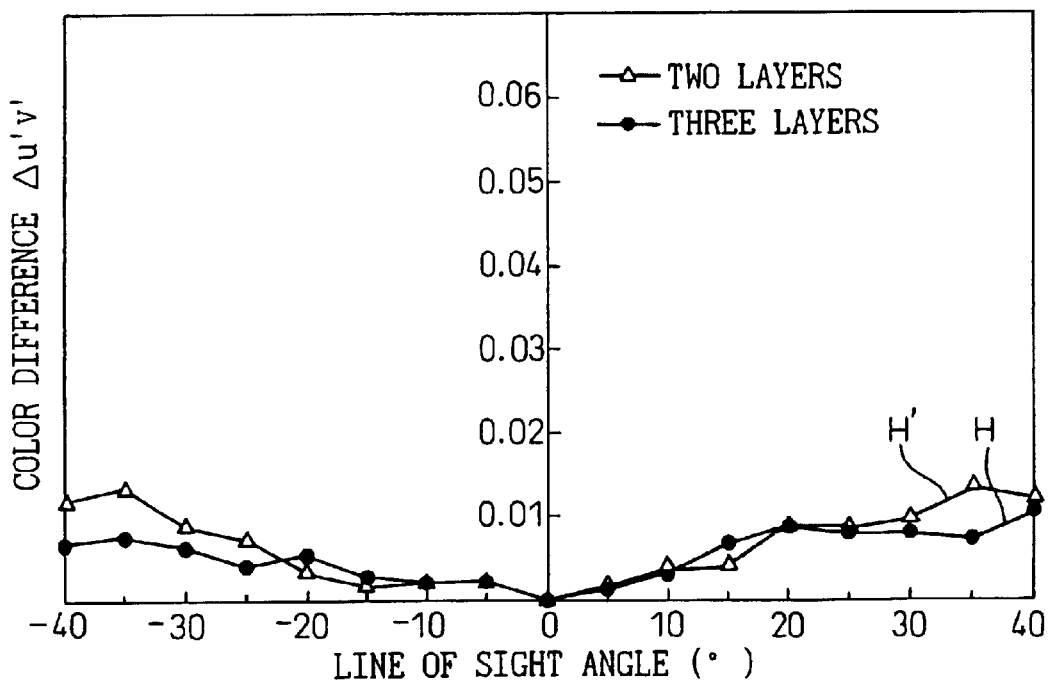
FIG. 18 is a chart illustrating changes in color difference $\Delta u'v'$ with respect to changes in line of sight angle, in the fourth embodiment.

The same measurements were made with regard to the holographic screen 2 thus produced as in the first embodiment. The results thereof, as shown in FIGS. 16, 17 and 18, indicated that, although the amount of change in the color differences $\Delta u'v'$ and $\Delta u'v'_{max}$ is somewhat greater than that of the holographic screen produced in the first embodiment (third embodiment), it is a large improvement over the holographic screen produced in the prior art and thus achieves favorable characteristics. In FIGS. 16 to 18, the reference symbol H' indicates values relating to the holographic screen of the present embodiment, and reference symbol H indicates values relating to the holographic screen of the first embodiment.

All other operational effects are the same as those in the third embodiment.

Fifth Embodiment

Figure 19:
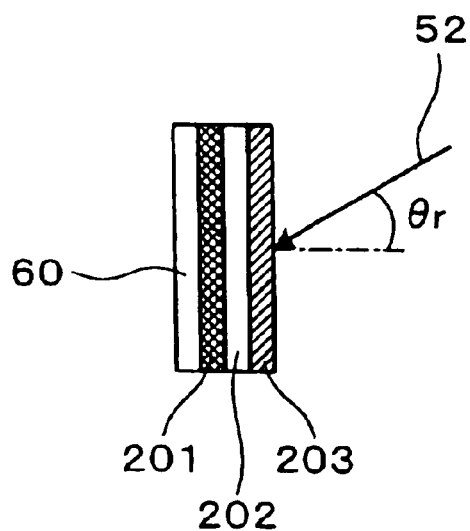
FIG. 19 is a partial view illustrating the manufacturing method of a secondary original master in a fifth embodiment of the present invention.
Figure 20:
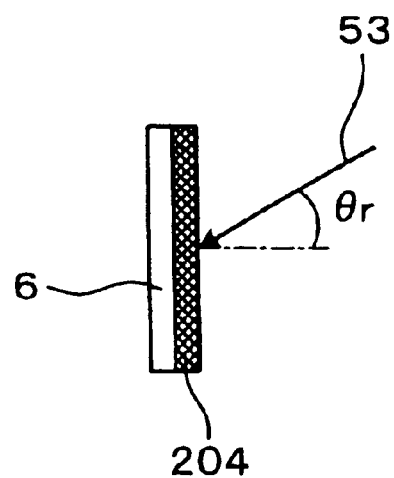
FIG. 20 is a partial view illustrating the hologram production method according to a fifth embodiment of the present invention.

The present embodiment, as shown in FIGS. 19 and 20, is a holographic screen 2 formed by a hologram 24 produced by creating a secondary master 204, copied from the primary masters 201, 202 and 203 manufactured by the same method as that used in the second embodiment, and then copying this secondary master 204.

That is, as shown in FIG. 19, as well as laminating the primary masters 201, 202 and 203, these are superposed over a master photosensitive material 60 and copied by irradiation by a secondary master reference beam 52 from the primary master side to produce the secondary master 204. Then, as shown in FIG. 20, the secondary master 204 is copied by superposing it on the photosensitive material 6 for copying and irradiating it with a reference beam for copying 53 from the secondary master side to produce the hologram 24.

The angle of incidence θr of the secondary master reference beam 52 when producing the secondary master 204 and the angle of incidence θr of the reference beam for copying 53 when producing the hologram 24 are substantially the same. Everything else is the same as in the first embodiment.

In this case also, a holographic screen 2 essentially the same as that of the fourth embodiment can be attained. Also, by copying the single layer secondary master 204, a number of holograms 24 can be produced. As a result, when a plurality of holographic screens 2 are produced, because the secondary master 204 is lightweight, it is easy to handle. Consequently, the holographic screen 2 is easy to manufacture.

Further, even if the secondary master 204 is damaged, it can be duplicated from the primary masters 201, 202 and 203 by the above method. As a result, rather than producing new primary masters 201, 202 and 203, a secondary master 204 having the same characteristics can be easily obtained.

All other operational effects are the same as those of the first embodiment.

Sixth Embodiment

Figure 21:
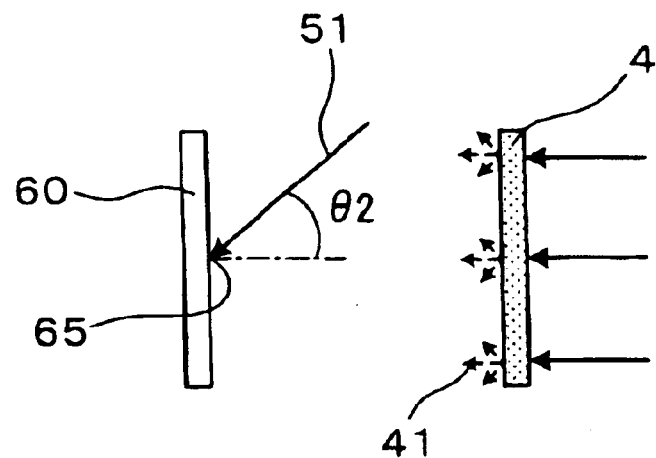
FIG. 21 is a partial view illustrating the manufacturing method of a primary master in a sixth embodiment of the present invention.
Figure 22:
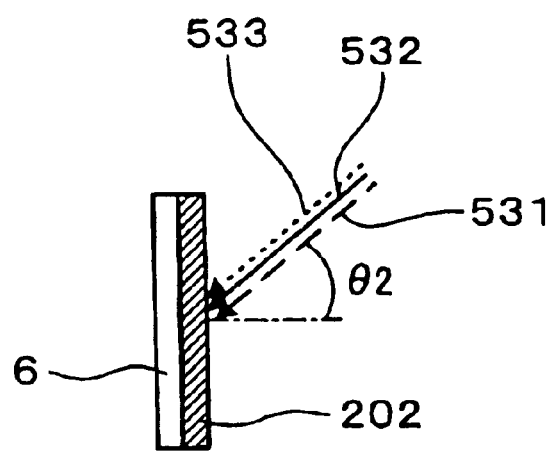
FIG. 22 is a partial view illustrating the hologram production method according to a sixth embodiment of the present invention.

The present embodiment, as shown in FIGS. 21 and 22, is a holographic screen 2 formed from a hologram 24 produced by copying a primary master 202 by irradiating it with three reference beams for copying 531, 532 and 533 of different types of wavelengths.

That is, as shown in FIG. 21, a single primary master 202 is produced by exposing a master photosensitive material 60 by the same method as the second embodiment. This single primary master 202 is copied by superposing it over the photosensitive material 6 for copying and irradiating it with reference beams for copying 531, 532 and 533 with three different types of wavelengths from the primary master side to produce the hologram 24.

As wavelengths of the above reference beams for copying 531, 532 and 533, the three wavelengths 476 nm of an argon laser, 532 nm of a fixed laser, and 647 nm of a krypton laser were used.

As other combinations of three wavelengths suitable for use, 488 nm or 514 nm of an argon laser, 568 nm of a krypton laser, 632 nm of a helium-neon laser, and the like, for example, can be used.

Also, the angle of incidence θ2 of the primary master reference beam 51 when producing the primary master 202 is 30°. The angle of incidence θ2 of the reference beams for copying 531, 532 and 533 is also 30°. Further, as the wavelength of the primary master reference beam 51, a wavelength of 514 nm using an argon laser was used.

All else is the same as the first embodiment.

In this case, reference beams for copying 531, 532 and 533 with a plurality of wavelengths are diffracted in respectively different directions in the primary master 202. Thereby, a holographic screen having the same characteristics as those of the first embodiment can be attained by the same effect as in the third embodiment. Also, the holographic screen 2 of the present invention can be formed by a single layer hologram 24 (refer to FIG. 14). As a result, an inexpensive and lightweight holographic screen can be achieved.

All other operational effects are the same as those of the first embodiment.

Seventh Embodiment

The present embodiment is a holographic screen 2 formed by a hologram 24 produced by laminating a plurality of primary masters 201 and 202 and copying them by irradiating a photosensitive material 6 for copying with reference beams for copying 531 and 532 having different wavelengths.

Figure 23:
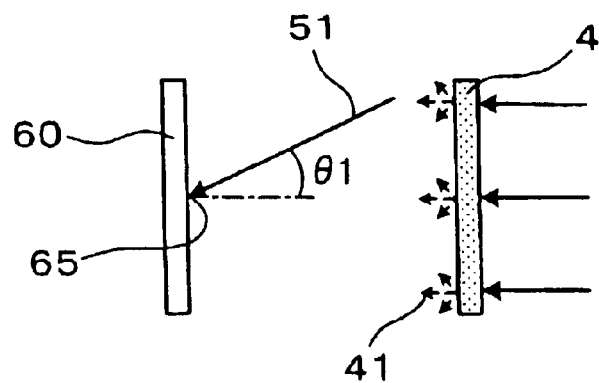
FIG. 23 is a partial view illustrating the manufacturing method of a primary master in a seventh embodiment of the present invention.
Figure 23:
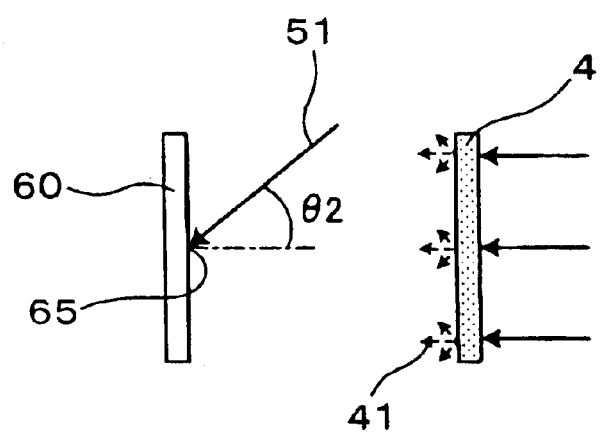
Figure 24:
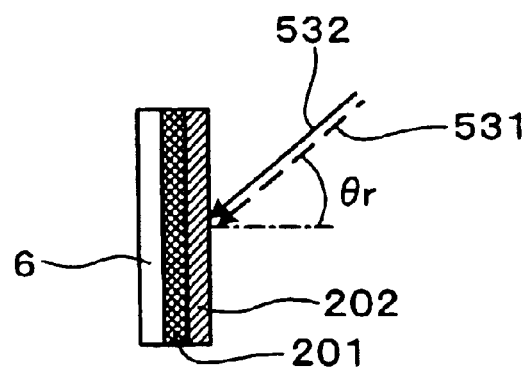
FIG. 24 is a partial view illustrating the hologram production method according to a seventh embodiment of the present invention.
Figure 25:
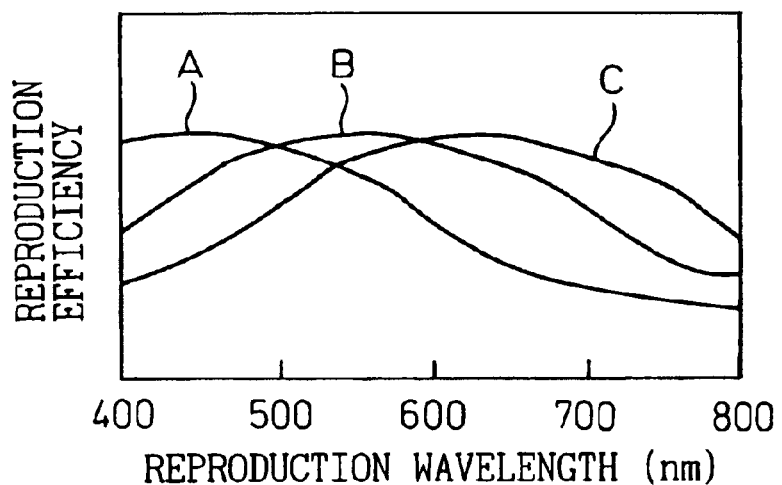
FIG. 25 is a chart illustrating spectral characteristics with respect to a fixed image beam resulting from three types of holograms having different reference beam incidence angles.
Figure 26:
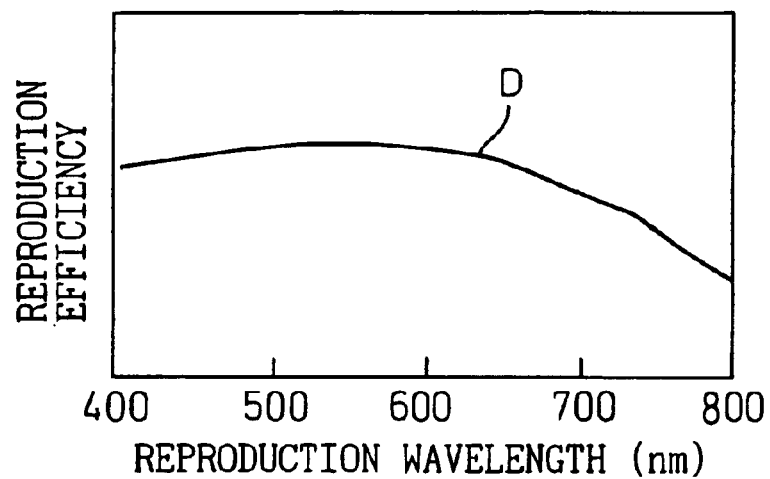
FIG. 26 is a chart illustrating spectral characteristics with respect to a fixed image beam when three types of holograms having different reference beam incidence angles are laminated.

The angles of incidence θ1 and θ2 of the primary master reference beam 51 on the center 65 of the photosensitive material 60 during exposure of the above plurality of primary masters 201 and 202 differ as shown in FIG. 23. Also, the angles of incidence θr of the reference beams for copying 531 and 532 on the photosensitive material 60 satisfy the condition θ1<θr<θ2. Everything else is the same as the third embodiment.

In this case, a combination of the operational effects of the third embodiment and the sixth embodiment is achieved.

What is claimed is:

1. A holographic screen for projecting an image beam from an image projection device to display an image, wherein:

the holographic screen is a plurality of laminated holograms;

each hologram is produced by exposing a photosensitive material to an object beam serving as a diffused beam transmitted through or reflected from a light diffuser, and a reference beam which is not a diffused beam; and an angle of incidence, with respect to the normal to the holographic screen, of the reference beam on a center of the photosensitive material during exposure differs for each said hologram, wherein a projection angle θc, with respect to the normal to the holographic screen, of the image beam while using the holographic screen and an angle of incidence θ of the reference beam on the photosensitive material during production of the holograms satisfy the following equation:

$$\theta c - 10° \leq \theta \leq \theta c + 10°.$$

2. The holographic screen according to claim 1, wherein the holographic screen is formed by laminating two holograms, and an angle of incidence θ1 of the reference beam during production of a first hologram and an angle of incidence θ2 of the reference beam during production of a second hologram among the two laminated holograms satisfy the following equations:

$$\theta 1 \leq \theta c \leq \theta 2,$$

$$0° < \theta 2 - \theta c \leq 10°,$$

$$0° < \theta c - \theta 1 \leq 10°, \text{ and}$$

$$2° \leq \theta 2 - \theta 1 \leq 20°.$$

3. The holographic screen according to claim 1, wherein the holographic screen is formed by laminating three holograms, and an angle of incidence θ1 of the reference beam during production of a first hologram, an angle of incidence θ2 of the reference beam during production of a second hologram and an angle of incidence θ3 of the reference beam during production of a third hologram among the three laminated holograms satisfy one of the following equations:

$$\theta 1 < \theta 3 \leq \theta c \leq \theta 2, \text{ or}$$

$$\theta 1 \leq \theta c \leq \theta 3 < \theta 2.$$

4. The holographic screen according to claim 3, wherein the following equations are satisfied:

$$0° < \theta 2 - \theta c \leq 10°,$$

$$0 \leq \theta c - \theta 1 \leq 10°, \text{ and}$$

$$2° \leq \theta 2 - \theta 1 \leq 20°.$$

5. The holographic screen according to claim 1, wherein the holographic screen is a transmission holographic screen.

6. A holographic screen for projecting an image beam from an image projection device to display an image, wherein:

the holographic screen is formed by a plurality of laminated holograms;

each hologram is produced by copying a primary master, produced by exposing a master photosensitive material to an object beam serving as a diffused beam transmitted through or reflected from a light diffuser and a primary master reference beam which is not a diffused beam, by superposing it on a photosensitive material for copying and irradiating it with a reference beam for copying; and an angle of incidence, with respect to the normal to the holographic screen, of the primary master reference beam on a center of the photosensitive material during exposure of the primary master differs for each said hologram, wherein a projection angle $\theta c$, with respected to the normal to the holographic screen, of the image beam while using the holographic screen and an angle of incidence $\theta$ of the reference beam on the photosensitive material during production of the holograms satisfy the following equation:

$$\theta c - 10° \leq \theta \leq \theta c + 10°.$$

7. The holographic screen according to claim 6, wherein the holographic screen is formed by laminating two holograms, and an angle of incidence $\theta 1$ of the reference beam during production of a first hologram and an angle of incidence $\theta 2$ of the reference beam during production of a second hologram among the two laminated holograms satisfy the following equations:

$$\theta 1 \leq \theta c \leq \theta 2,$$

$$0° < \theta 2 - \theta c \leq 10°,$$

$$0° < \theta c - \theta 1 \leq 10°, \text{ and}$$

$$2° \leq \theta 2 - \theta 1 \leq 20°.$$

8. The holographic screen according to claim 6, wherein the holographic screen is formed by laminating three holograms, and an angle of incidence $\theta 1$ of the reference beam during production of a first hologram, an angle of incidence $\theta 2$ of the reference beam during production of a second hologram and an angle of incidence $\theta 3$ of the reference beam during production of a third hologram among the three laminated holograms satisfy one of the following equations:

$$\theta 1 < \theta 3 \leq \theta c \leq \theta 2, \text{ or}$$

$$\theta 1 \leq \theta c \leq \theta 3 < \theta 2.$$

9. The holographic screen according to claim 8, wherein the following equations are satisfied:

$$0° < \theta 2 - \theta c \leq 10°,$$

$$0° < \theta c - \theta 1 \leq 10°, \text{ and}$$

$$2° \leq \theta 2 - \theta 1 \leq 20°.$$

10. The holographic screen according to claim 6, wherein the holographic screen is a transmission holographic screen.

11. A holographic screen for projecting an image beam from an image projection device to display an image, wherein:

the holographic screen is formed by a hologram produced by preparing a plurality of primary masters, produced by exposing a master photosensitive material to an object beam serving as a diffused beam transmitted through or reflected from a light diffuser and a primary master reference beam which is not a diffused beam, laminating the plurality of primary masters, and copying them by superposing them on a photosensitive material for copying and irradiating them with a reference beam for copying from the Primary master side: and an angle of incidence, with respect to the normal to the holographic screen, of the primary master reference beam on a center of the master photosensitive material during exposure differs for each said primary master, wherein a projection angle $\theta c$, with respect to the normal to the holographic screen, of the image beam while using the holographic screen and an angle of incidence $\theta$ of the primary master reference beam on the photosensitive material during production of the holograms satisfy the following equation:

$$\theta c - 10° \leq \theta \leq \theta c + 10°.$$

12. The holographic screen according to claim 11, wherein two primary masters are produced, and an angle of incidence $\theta 1$ of the primary master reference beam during production of a first primary master and an angle of incidence $\theta 2$ of the primary master reference beam during production of a second primary master among the two primary masters satisfy the following equations:

$$\theta 1 \leq \theta c \leq \theta 2,$$

$$0° < \theta 2 - \theta c \leq 10°,$$

$$0° < \theta c - \theta 1 \leq 10°, \text{ and}$$

$$2° \leq \theta 2 - \theta 1 \leq 20°.$$

13. The holographic screen according to claim 11, wherein three primary masters are produced, and an angle of incidence $\theta 1$ of the primary master reference beam during production of a first primary master, an angle of incidence $\theta 2$ of the primary master reference beam during production of a second primary master, and an angle of incidence $\theta 3$ of the primary master reference beam during production of a third primary master among the three primary masters satisfy the following equations:

$$\theta 1 < \theta 3 \leq \theta c \leq \theta 2, \text{ or}$$

$$\theta 1 \leq \theta c \leq \theta 3 < \theta 2.$$

14. The holographic screen according to claim 13, wherein the following equations are satisfied:

$$0° < \theta2-\theta c \leq 10°,$$

$$0° < \theta c-\theta1 \leq 10°, \text{ and}$$

$$2° \leq \theta2-\theta1 \leq 20°.$$

15. The holographic screen according to claim 11, wherein the holographic screen is a transmission holographic screen.

16. A holographic screen for projecting an image beam from an image projection device to display an image, wherein:

the holographic screen is formed by a hologram produced by preparing a plurality of primary masters, produced by exposing a master photosensitive material to an object beam serving as a diffused beam transmitted through or reflected from a light diffuser and a primary master reference beam which is not a diffused beam, laminating the plurality of primary masters, and copying them by producing a secondary master by copying the plurality of primary masters by superposing them on a single layer master photosensitive material and irradiating them with a secondary master reference beam from the primary master side, and superposing the secondary master on a photosensitive material for copying and irradiating it with a reference beam for copying from the secondary master side; and an angle of incidence, with respect to the normal to the holographic screen, of the primary master reference beam on a center of the photosensitive material during exposure differs for each said primary master, wherein a projection angle $\theta c$, with respect to the normal to the holographic screen, of the image beam while using the holographic screen and an angle of incidence $\theta$ of the primary master reference beam on the photosensitive material during production of the holograms satisfy the following equation:

$$\theta c-10° \leq \theta \leq \theta c+10°.$$

17. The holographic screen according to claim 16, wherein two primary masters are produced, and an angle of incidence $\theta1$ of the primary master reference beam during production of a first primary master, and an angle of incidence $\theta2$ of the primary master reference beam during production of a second primary master among the two primary masters satisfy the following equations:

$$\theta1 \leq \theta c \leq \theta2,$$

$$0° < \theta2-\theta c \leq 10°,$$

$$0° < \theta c-\theta1 \leq 10°, \text{ and}$$

$$2° \leq \theta2-\theta1 \leq 20°.$$

18. The holographic screen according to claim 16, wherein three primary masters are produced, and an angle of incidence $\theta1$ of the primary master reference beam during production of a first primary master, an angle of incidence $\theta2$ of the primary master reference beam during production of a second primary master, and an angle of incidence $\theta3$ of the primary master reference beam during production of a third primary masters among the three primary masters satisfy the following equations:

$$\theta1 < \theta3 \leq \theta c \leq \theta2, \text{ or}$$

$$\theta1 \leq \theta c \leq \theta3 < \theta2.$$

19. The holographic screen according to claim 18, wherein the following equations are satisfied:

$$0° < \theta2-\theta c \leq 10°,$$

$$0° < \theta c-\theta1 \leq 10°, \text{ and}$$

$$2° \leq \theta2-\theta1 \leq 20°.$$

20. The holographic screen according to claim 16, wherein the holographic screen is a transmission holographic screen.

* * * * *